United States Patent
Hoesel et al.

(10) Patent No.: US 6,903,674 B2
(45) Date of Patent: Jun. 7, 2005

(54) PROCEDURE AND ARRANGEMENT FOR JAMMING LASER MEASURING INSTRUMENTS

(75) Inventors: Holger Hoesel, Dresden (DE); Sven Diestel, Dreieich (DE)

(73) Assignee: Holger Hösel, Dresden (DE)

( * ) Notice: Subject to any disclaimer, the term of this patent is extended or adjusted under 35 U.S.C. 154(b) by 0 days.

(21) Appl. No.: 09/568,227

(22) Filed: May 8, 2000

(65) Prior Publication Data

US 2004/0257262 A1 Dec. 23, 2004

(30) Foreign Application Priority Data

May 7, 1999 (DE) .......................................... 199 38 398

(51) Int. Cl.[7] .............................. G01S 7/36; F41G 7/00
(52) U.S. Cl. ........................... 342/13; 342/14; 244/3.16
(58) Field of Search ..................... 342/13, 14; 244/3.16; 250/504 R; 359/111

(56) References Cited

U.S. PATENT DOCUMENTS

| | | | | |
|---|---|---|---|---|
| 3,978,342 A | * | 8/1976 | Hagen et al. | |
| 4,990,919 A | * | 2/1991 | Manoogian | 342/14 |
| 5,061,930 A | * | 10/1991 | Nathanson et al. | 342/13 |
| 5,715,045 A | | 2/1998 | Dunne | 356/28 |
| 5,742,384 A | * | 4/1998 | Farmer | |

FOREIGN PATENT DOCUMENTS

| DE | 24 08 058 | 8/1975 |
|---|---|---|
| WO | 97/21110 | 6/1997 |

OTHER PUBLICATIONS

B. Keirstead et al, J. of Electronic Defense, May 1992, vol. 15, No. 5, Aircraft Survivability in the 21st Century–AT-IRCM.*

* cited by examiner

Primary Examiner—Thomas H. Tarcza
Assistant Examiner—Brian Andrea
(74) Attorney, Agent, or Firm—Womble Carlyle Sandridge & Rice, PLLC

(57) ABSTRACT

The invention concerns a procedure for emission of jamming signals for jamming of laser-based measuring instruments as a result of which systems for distance or speed measurement of targets using laser reflection receive further signals (jamming signals) in addition to the laser signals emitted by the measuring system itself and then reflected at the target. The invention is applicable to affect the distance or speed measurement of targets by means of laser-based measuring instruments, where the measurement procedure of the respective laser-based measuring system is jammed or even prevented.

30 Claims, 4 Drawing Sheets

PROCEDURE AND ARRANGEMENT FOR JAMMING LASER MEASURING INSTRUMENTS

Figure 1:
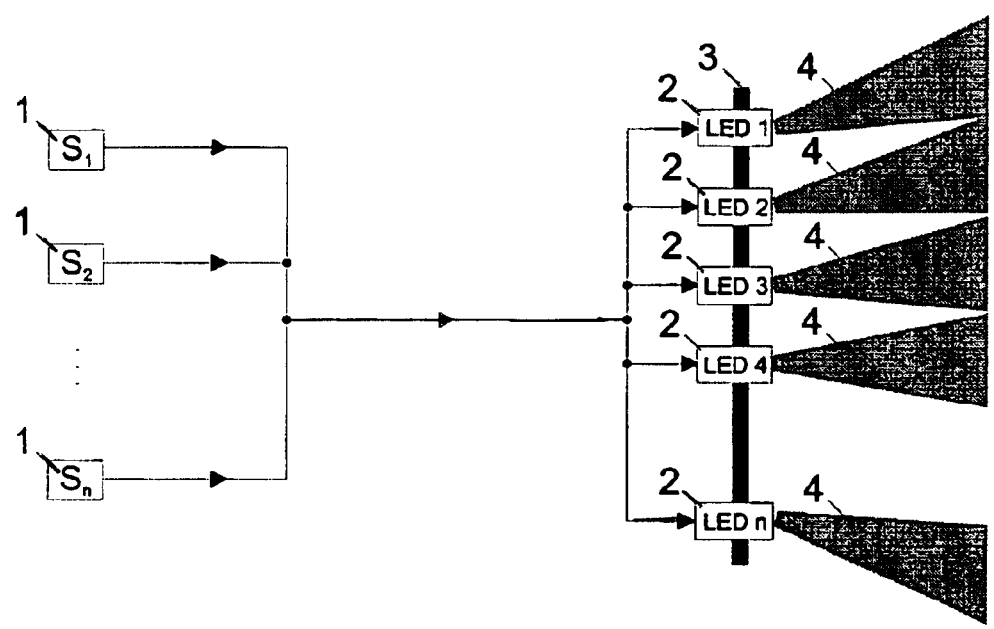

The invention concerns a procedure for emission of jamming signals as a result of which systems for distance and/or speed measurement of targets using laser reflection receive further signals (jamming signals) in addition to the laser signals emitted by the measuring system itself and then reflected at the target. Further, the invention concerns an arrangement for implementation the procedure for emission of jamming signals to disable laser-based measuring instruments.

The invention is applicable to affect the distance and/or speed measurement of targets by means of laser-based measuring instruments, where the measurement procedure of the respective laser-based measuring system is jammed or even prevented.

Furthermore, the invention covers other fields as designated by laser-based measuring instruments, for example the fields of target discrimination and/or target location by means of laser-based devices.

According to the known state of the art, in order to determinate the speed of a moving target by means of laser-based measuring systems extremely short pulses of infrared light are transmitted in the direction of a target and then pulses reflected by the target are received. When a measurement procedure is carried out in accordance with the known state of the art the time-of-flight of the pulse is determined as the time interval between transmission of a pulse up to arrival of the reflected pulse. Consequently, the distance of the target can be determined from the time-of-flight of the pulse and speed of light.

Laser-based measuring systems carry out several of these rangings within exactly defined time intervals. Usually 40 rangings are carried out the order of 0.3 to 1.0 seconds. The respective range-to-target readings determined by the measurements are stored and the speed of the moving target is then computed by the intern logic of the measuring system. Consequently, the speed results from the rise of regression line in path-/time diagram.

Furthermore, it is a well-known fact that transmission of infrared light pulses of same wavelength is used to protect a target against a measurement. As a result, in addition to the laser signals emitted by the measuring system itself and then reflected at the target further signals were received as jamming signals causing to erroneous measurements of time-of-flight.

Various of such procedures which transmit previously received infrared pulses by means of laser transmitters or by means of reflection time-delayed were developed for the military field and are known for example from DE 36 09 834 A1.

The disadvantage of these known solutions according to the state of the art exists however in that the construction of laser detectors and laser transmitters as well as the required modules for delay electronics is complex and expensive.

On the other hand, high-intensity light generators are mentioned as a possible configuration for jamming sources from U.S. Pat. No. 5,715,045. However, no construction details of these light generators are given within the quoted solution.

Further, a very simple possibility for jamming of laser-based measuring systems is the use of high powered head-lights which are pointed at the measuring systems. In this case, the infrared parts contained in the spectrum of the headlight interfere with the infrared pulses emitted by the measuring system itself and this consequently resulting in jamming of the measuring system. However, the disadvantages of this method are that high energy demand and furthermore, high space are required for the operation of such an arrangement. In addition, such arrangement is visible to a large extent.

Starting from the previously mentioned state of the art, the task of the invention is to create a procedure for emission of jamming signals, that allowing an effective jamming of laser-based measuring systems and moreover works economically.

Furthermore, starting from the previously mentioned state of the art the task of invention consists in the creation of an arrangement for realization of the procedure, which has small dimensions and requires small power consumption.

Starting from the previously mentioned state of the art, the task is solved according to the invention by the inventive features of main claim 1. The signal generators are electrically connected with the emission components and generate signals differing from each other at their master frequency. Useful solutions of the same task of the invention are described in coordinated claims 2, 5, 11, 12, 18 and 22. Corresponding and useful rendering and further developments of the invention are contained in the corresponding sub-claims. Furthermore, the task is solved by an arrangement according to the features of patent claim 23, where useful renderings and further developments are described in corresponding sub-claims.

By means of the inventive procedure in accordance with the features of main claim and its secondary claims, a simple but also effective jamming of measuring radiation is possible by using a plurality of optical emission components driven in a defined manner by a plurality of signal generators.

During realization of the procedure in accordance with patent claim 2, each signal generator produce a signal having the same master frequency. In this case, in accordance with the invention, the signal generators are synchronized in such a way that pulses of the jamming signal form a time-dense sequence within the aggregate emission signal. As a result it is possible to jam the reflected strobes of the measuring system with sufficing safety. The same effect principle can be realized by carrying out the procedure in accordance with claim 11.

Generally, for a reliable jamming of the measuring procedure any given time-variable signal is suitable for drive of the optical emission components if it contains—related to time—sufficiently many, strongly marked amplitude rises and drops. Therefore a jamming is achieved by suitable carrying out of the procedure in accordance with claim 18 —for example by generating a not-harmonic signal by means of a digital signal processor.

By transmission of pulses with non-constant pulse spacing in accordance with patent claim 5, however at sufficiently high pulse density the measuring system is jammed with high probability between the reception of two consecutive strobes. Consequently, there is no risk that jamming pulses are sent out within a complete measuring cycle at non-appropriated moments. So it is extremely difficult or even impossible to carry out a secondary logic fade-out of jamming pulses by the laser-based measuring system.

The measures in the corresponding sub-claims are suitable for example to increase the maximally permissible pulse current for the optical emission components so that among other things, a larger emission power and therefore an enlargement of range of the jamming radiation can be achieved. When the procedure is carried out in accordance with patent claim 3, two signal generators are already sufficient for an effective jamming whereby expenditure to the circuit is reduced to a minimum.

In accordance with patent claim 6, a random- or pseudo-random generator can be used in useful manner to produce pulses with non-constant time spacing. The time synchronization of the signal generators can be advantageous especially during the carrying out of the procedure in accordance with patent claim 2.

In accordance with the invention optical emission elements are used for an arrangement carrying out the described procedure where light-emitting diodes are planned in useful manner.

According to carrying out of the procedure the arrangement consist of a plurality of definitely arranged light-emitting diodes sending jamming radiation in direction of the measuring system. As a result, the laser signals emitted by the measuring system itself and then reflected at the target are jammed or further jamming signals are received which causing to erroneous measurements of time-of-flight. The benefits of such an arrangement especially are extremely small dimension and low energy demand by using light-emitting diodes.

On the basis of small dimension for example it is possible to arrange light emitting diodes with simple expedient and in appropriate manner like in rows, groups or in other useful layouts onto comparably relatively small space. As a result, such arrangements according to the invention do not need over-dimensioned, large case housings in contrast to the known state of the art. In addition, light-emitting diodes are simple to assemble and to service.

Especially a further benefit is, that light-emitting diodes are low cost and long living. Furthermore, signal generators can drive light-emitting diodes depending on preconditions in a defined manner.

Consequently, for example it is possible in simple manner to release signal energy to the light-emitting diodes from separated single signal generators or several ones working in the same or different way. The drive can be done both, for individual and for the combination of a plurality of light-emitting diodes. For drive of light-emitting diodes no complicated pulse generation of specific pulse shaping is required. For example, simple square-wave pulses can be used.

The use of a digital signal processor in accordance with an useful rendering of the invention has the benefit that a cost-effective and simple possibility for generation of various signals based on mathematical algorithms can occur. Finally the use of a multiplexer in accordance with a further, significant rendering of the invention is especially suitable to generate partial signals for groups of light-emitting diodes. As a result, it is possible to drive a larger number of groups of light-emitting diodes by use of only one, relatively inefficient signal generator.

Figure 2:
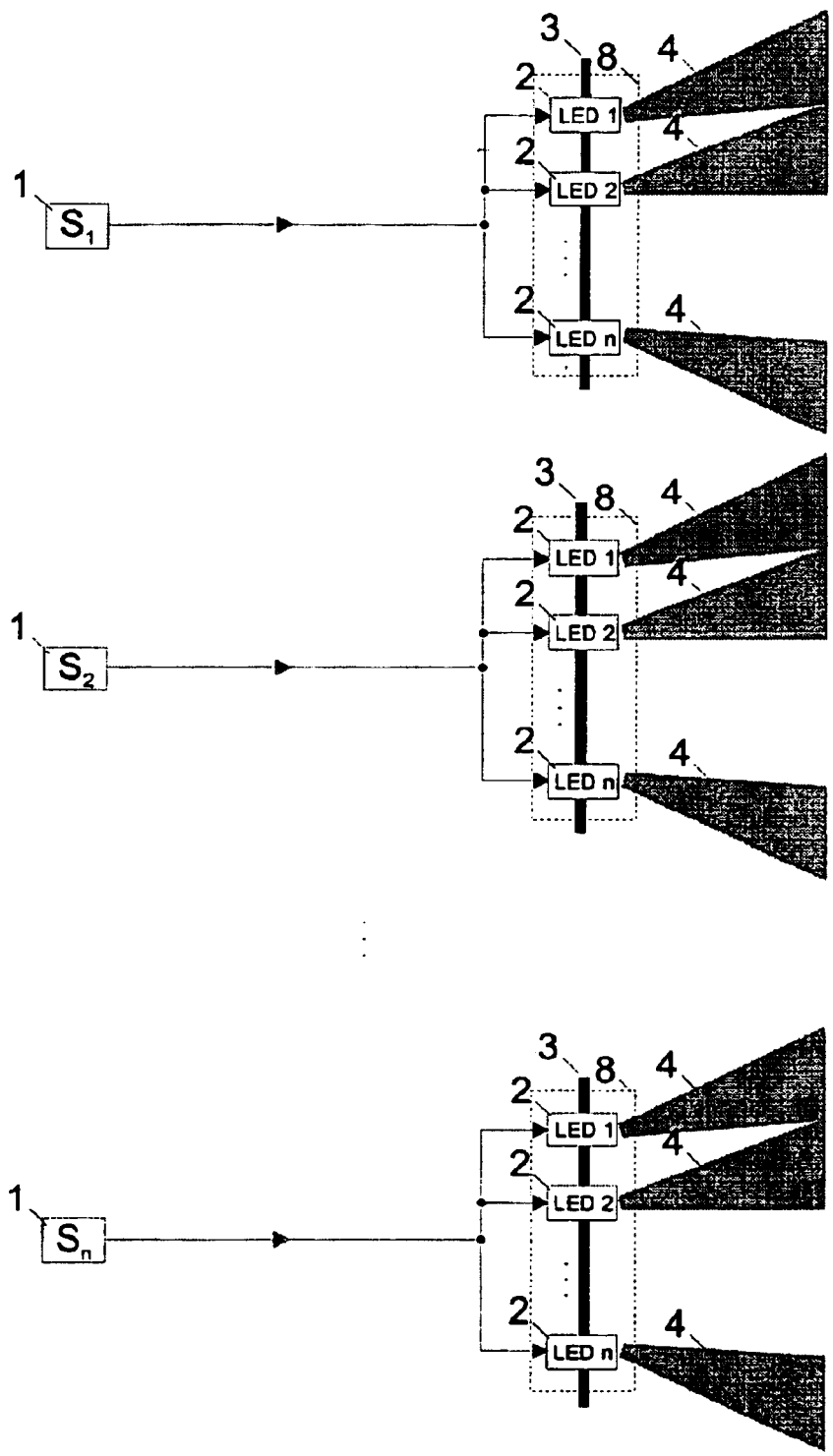
Figure 3:
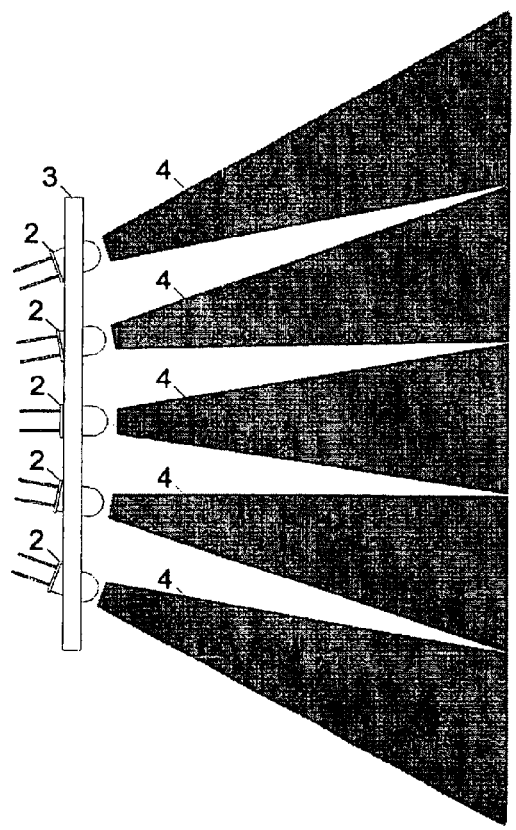
Figure 4:
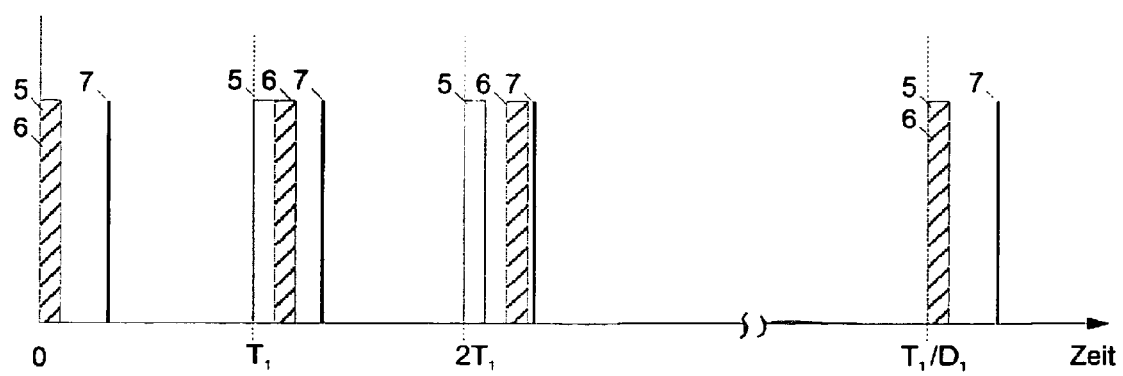

The invention is explained at the following by means of an example and by means of drawings more closely. Figures show within associated drawings:

FIG. 1: A schematic block diagram with a first implementation of an arrangement according to the invention;

FIG. 2: A schematic block diagram of another implementation according to the invention;

FIG. 3: A schematic partial view of the mount with arrangement of the separate light-emitting diodes forming the total radiation sector;

FIG. 4: A timing diagram of the pulse sequence in case of using two signal generators and FIG. 5: A schematic block diagram of an implementation according to the invention and using a multiplexer.

Within FIG. 1 signal generators for generation of signal energy are characterized by reference symbol "1".

FIGS. 1 and 2 schematically illustrate variants of an arrangement according to the invention, where a plurality n of signal generators (1) is electric-conductively connected with a plurality n of light-emitting diodes (2). The signal generators (1) control the light-emitting diodes (2) via wire. Each signal generator (1) produces square-wave pulses of short pulse width and operates with a different pulse repetition frequency. The light emitting-diodes (2) are arranged in a mount (3) in such manner, that the several radiation sectors (4) of light-emitting diodes (2) form the total radiation sector pointing at a not presented laser-based measuring system.

The ratio of pulse width $t_p$ to cycle duration T is designated as duty cycle D. The lower the duty cycle D, the greater the maximally permissible pulse sequence for the light-emitting diodes (2) is, by which momentary high emission powers are allowed. Latter ones form the assumption in order to generate an effective jamming radiation by light-emitting diodes (2).

However, small duty cycles D have a critical disadvantage. The time interval during that no jamming pulse (5; 6) is sent out, is relatively large in relation to the cycle duration. Consequently, there is a risk that within this time interval a strobe (7) emitted by the measuring system in the direction of the target and then reflected at this one, is received without any jamming because the time-of-flight of the strobes (7) is extremely short.

On the other hand, a laser-based measuring system which is sending out several strobes (7) within exactly defined time intervals in order to calculate the speed of a target is most reliably jammed if the jamming pulses (5; 6) are received as synchronous as possible or received only insignificant asynchronously with the reflected strobes (7). If this is not guaranteed, there is the risk that a jamming pulse (5; 6) as such one is identified from the internal logic of the laser-based measuring system.

The reason for this is, that the strobe (7) emitted by the measuring system itself and then reflected at the target is only expected within a fixed time interval, which is determined by time-of-flight of light along the double minimum permissible measuring distance and/or the double maximally permissible measuring distance.

For example, if a measuring distance of 1500 meter is assumed, this time interval is only approximately 10 microseconds. Consequently, it is necessary to send at least one jamming pulse within this time interval to have a reliable jamming effect. If only one signal generator is used for generation of jamming pulses, this one has to work consequently with a cycle duration of 10 microseconds. For example, a duty cycle of D=0.1 results in a pulse width of 1 microsecond. However, such a short pulse width can not be realized because of physical switching characteristic depending on type of used light-emitting diodes (2) or can be realized only with high expenditure.

In order to solve this problem the light-emitting diodes (2) are driven by a plurality of signal generators (1). In this case, each of these signal generators (1) works with another frequency. Thus, the more signal generators (1) are used in the overall system, the higher the safety for an effective generation of jamming pulses will be.

At the arrangement in accordance with FIG. 1, signal generators (1) drive only a group (8) of light-emitting diodes (2). For definition of the duty cycle that determines the maximally permissible pulse current of light-emitting diodes in addition to the generator frequency, the sum of pulse widths of the several generators will be related to the cycle duration of the generator with the highest frequency.

In FIG. 2, a variant of an arrangement is schematically illustrated, which contains a plurality of groups (8) of light-emitting diodes (2). Each of this groups are driven by only one signal generator (1).

This arrangement has a decisive advantage in spite of a greater number of light-emitting diodes (2): The maximally permissible pulse current is considerably higher than at the arrangement according to FIG. 1, because it is determined by frequency and duty cycle of the respective signal generator (1). Consequently, the peak emission power emitted by the light-emitting diodes is much higher.

FIG. 3 schematically shows the orientation of light-emitting diodes (2) within a group (8) aligned at the mount (3) under different angles. The combination of radiation sectors (4) of individual light-emitting diodes forms a total radiation sector, that illuminates each possible angle of bearing to target for a measurement by the laser-based system. In this way, jamming pulses are homogeneously emitted within the total radiation sector causing erroneous time-of-flight measurements by laser-based measuring systems.

FIG. 4 shows a representation of the pulse sequence during carrying out of the procedure in accordance with patent claim 3 in case of using of two signal generators producing square-wave pulses of same pulse width $t_p$. Both signal generators send out jamming pulses $S_1$ (5) and $S_2$ (6) of pulse width $t_p$ at periodic intervals $T_1$ and $T_2=T_1+t_p$.

Both jamming pulses (5;6) are time synchronously emitted at consideration's initial time. Both jamming pulses (5;6) are time-shifted by pulse width $t_p$ to each other after one cycle duration $T_1$, by 2 $t_p$ after two cycle durations and so on. After a total number of $T_1/t_p$ (equal to the reciprocal of the duty cycle=$1/D_1$) cycle durations, both jamming pulses (5;6) are synchronous to each other again. Therefore, during the time interval $T_1/D_1$, the jamming pulse $S_2$ (6) completely covers each possible time position within cycle duration $T_1$. This cycle duration $T_1$ is chosen now in such a way that the time interval $T_1/D_1$ is not larger than the total measuring time $T_M$ of the laser-based measuring system. In case of usual measuring times $T_M$=0.3 seconds to 1.0 seconds and a duty cycle of $D_1$=0.1, a pulse width $t_p=T_1 D_1$ of several milliseconds results from this.

The not represented laser-based measuring system sends out several strobes (7) at exactly defined time intervals to determinate range-to-target readings within the total measuring time $T_M$, where at least one of these strobes (7) is time-synchronous to the jamming signals $S_1$(5) or $S_2$ (6) and therefore is disturbed. This fact is sufficient to cancel the measurement because the intern logic of the measuring system computes the speed of the moving target from the rise of the regression line in the path-/time diagram and uses the deviation of the single measured values from the regression line for measurement error judgement.

Figure 5:
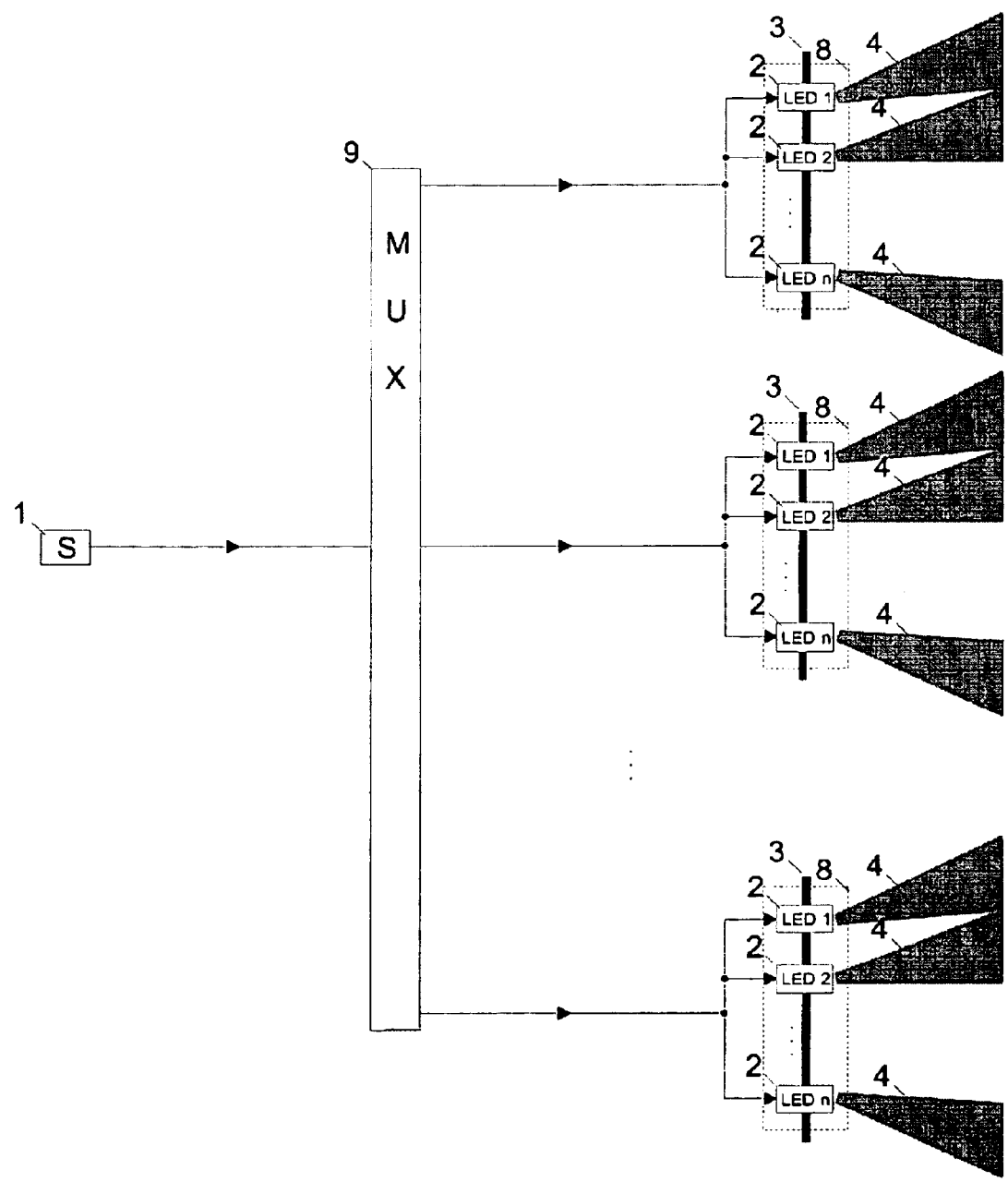

The scheme represented in FIG. 5 shows a variant of the arrangement using a multiplexer (9). The multiplexer (9) is inserted between a signal generator (1) and the plurality of light-emitting diodes (2). This make it possible to produce separate signals for a greater number of groups (8) of light-emitting diodes (2) with only one, relatively inefficient signal generator.

LIST OF REFERENCE NUMBERS 1 signal generator
2 light-emitting diode
3 mount
4 radiation sector of single light-emitting diodes
5 jamming pulse S1
6 jamming pulse S2
7 strobe
8 groups of light-emitting diodes
9 multiplexer
D duty cycle
T cycle duration
$T_M$ measuring time
$t_p$ pulse width
n number, for example number of components

What is claimed is:

1. A procedure for generation and emission of jamming signals directed toward a laser-based measuring system that determines distance and/or speed of targets by sending laser signals to a target from a laser transmitter and receiving, at a laser detector, the laser signals reflected from the target, said procedure comprising the step of:

emitting jamming signals in a direction of the laser-based measuring system, the jamming signals being generated by a plurality of light emitting diodes (LEDs) each operating within a wavelength range of the laser transmitter of the measuring system to be jammed, said LEDs being driven by at least two signal generators which produce periodical signals and at least two of these periodical signals differing from each other by a master frequency, whereby the composite of the periodical signals is characterized by a non-constant period.

2. A method jamming a laser-based measuring system that determines a distance and/or speed of targets by sending laser signals to a target from a laser transmitter and receiving, at laser detector, the laser signals reflected from the target, the method comprising the steps of:

generating at a target, periodic signals using at least two signal generators, at least two of the periodic signals differing from each other by a master frequency such that the composite of the periodic signals exhibits a non-constant time spacing, the periodic signals constituting jamming signals;

emitting, by a plurality of emission components operating within a wavelength range of the laser-based measuring system and driven by the signal generators, the jamming signals toward the law-based measuring system.

3. A procedure for generation and emission of jamming signals directed toward a laser-based measuring system that determines distance to and/or speed of targets using laser reflection, the procedure comprising:

emitting jamming signals in a direction of a laser-based measuring system from a plurality of optical emission component, operating within a wavelength range of the measuring system to be jammed, the optical emission components being driven by at least two signal generators that produce periodic signals, at least two of the signals having the same master frequency.

4. Procedure of claim 1, wherein at least two signal generators produce pulses.

5. Procedure of claim 1, wherein at least one signal generator produces pulses with non-constant time spacing to each other.

6. Procedure of claim 1, wherein at least one signal generator produces pulses in a pseudo-random sequence.

7. Procedure of claim 1, wherein at least two signal generators are time-synchronized to each other.

8. Procedure of claim 4, wherein pulses generated by one of the signal generators differ in pulse width from pulses generated by another of the signal generators.

9. Procedure of claim 1, wherein each signal generator drives the totality of the used optical emission components.

10. Procedure of claim 1, wherein each signal generator drives any groups of the optical emission components.

11. A procedure for generation and emission of jamming signals directed toward a laser-based measuring system that determines distance to and/or speed of targets using laser reflection from the targets, the procedure comprising:

emitting jamming signals in a direction of a law-based measuring system by a plurality of optical emission components operating within a wavelength range of the measuring system to be jammed, the emitting step including driving the optical emission components by at least one signal generator, wherein at least one signal generator produces pulses with non-constant time spacing relative to each other.

12. Procedure of claim 11, wherein at least one signal generator produces pulses in a random or pseudo-random sequence.

13. Procedure of claim 11, wherein at least one signal generator produces pulses of different pulse width.

14. Procedure of claim 11, wherein at least one signal generator produces a signal selected from the group consisting of a modulated signal, a random signal and a pseudo-random signal.

15. A procedure for generation and emission of jamming signals directed toward a laser-based measuring system for distance and/or speed measurement of targets using laser reflection, comprising the stop of:

emitting jamming signals in a direction of laser-based measuring system by a plurality of optical emission components operating within a wavelength range of the measuring system to be jammed, the emitting step including driving the optical emission components by at least one signal generator, wherein at least one signal generator produces a time-variable signal, and wherein at least one signal generator produces a signal having one or more of the characteristics selected from the group consisting of non-constant amplitude, non-constant frequency, and non-constant phase.

16. Procedure of claim 15, wherein at least one signal generator produces a signal selected from the group consisting of a modulated signal, a noise signal, a random signal and a pseudo-random signal.

17. A system for carrying out of a procedure for generation and emission of jamming signals directed toward a laser-based measuring system for distance and/or speed measurement of targets using laser reflection, said system comprising a plurality of light-emitting diodes operating within a wavelength range of the measuring system to be jammed; said plurality of light-emitting diodes being arranged under different angles in such a way that at least one combined radiation sector is formed by the combination of a plurality of radiation sectors of the individual light-emitting diodes.

18. The system of claim 17, wherein said at least one combined radiation sector is developed in such manner, that every possible angle of approach to the target is illuminated by light-emitting diodes.

19. The system of claim 17, and said plurality of light-emitting diodes being arranged in a mount, and said system further comprising a radiation-leaky, pane-styled covering arranged between the light-emitting diodes and any laser-based measuring system.

20. System of claim 19, wherein said pane-styled covering is a pane of glass.

21. System of claim 17, wherein a plurality of combined radiation sectors are formed from the combination of said plurality of radiation sectors and further individual light-emitting diodes, wherein all combined radiation sectors are arranged to emit light in generally the same direction.

22. System of claim 17, further comprising at least one signal generator electrically connected with a first plurality of the plurality of light emitting diodes.

23. A system of claim 22, wherein at least one signal generator is realized by using a digital signal processor.

24. A system of claim 22, wherein a multiplexer is switched between at least one signal generator and the light-emitting diodes.

25. A method for jamming a laser-based measuring system that determines distance to and/or speed of targets by sending laser signals to a target from a laser transmitter and receiving, at a laser detector, the laser signals reflected from the target, the method comprising the steps of:

(a) generating, at a target, at least two periodic signals using at least two signal generators, at least two of the periodic signals differing from each other by a predetermined frequency;

(b) generating, at the target, a plurality of light emitting diodes (LEDs) that emit radiation within a wavelength range, of the laser transmitter of the measuring system; and (c) driving said plurality LEDs with the at least two periodic signals to cause the LEDs to emit radiation toward the measuring system.

26. The method of claim 25 and wherein each of the plurality of LEDs has an individual radiation sector and wherein the plurality of LEDs are arranged so that their individual radiation sectors combine to define a total radiation sector.

27. A method of jamming a laser-based measurement system that determines distance to and/or speed of a target by emitting toward the target a pulsed laser signal and detecting reflections of the pulsed laser signal from the target, the method comprising emitting pulsed radiation from the target toward the measurement system, the pulsed radiation having an electromagnetic wavelength within a wavelength range of the measurement system and being characterized by a sequence of emitted pulses having non-constant time spacing relative to each other.

28. The method of claim 27 wherein the sequence of pulses are emitted by an emitter driven by a signal generator generating a signal characterized by a sequence of pulses having non-constant time spacing relative to each other.

29. The method of claim 27 and wherein the sequence of pulses are emitted by an emitter driven by at least two signal generators each generating a signal characterized by a sequence of pulses, the signal of one signal generator having a pulse frequency different from that of the signal from the other signal generator, the composite of the signal from the two signal generators being characterized by a sequence of pulses having non-constant time spacing relative to each other.

30. The method of claim 29 and wherein the at least two signal generators generate signals having pulse frequencies that differ from each other by a predetermined amount.

* * * * *

UNITED STATES PATENT AND TRADEMARK OFFICE
CERTIFICATE OF CORRECTION

PATENT NO. : 6,903,674 B2
DATED : June 7, 2005
INVENTOR(S) : Holger Hoesel

It is certified that error appears in the above-identified patent and that said Letters Patent is hereby corrected as shown below:

Column 6,
Line 44, "law-based", should read -- laser-based --.

Column 7,
Line 9, "law-based", should read -- laser-based --.

Column 8,
Line 25, "generating", should read -- arranging --.

Signed and Sealed this

Thirtieth Day of August, 2005

JON W. DUDAS
*Director of the United States Patent and Trademark Office*